United States Patent
Sankaranaraynan et al.

(10) Patent No.: US 7,508,754 B1
(45) Date of Patent: Mar. 24, 2009

(54) METHOD AND SYSTEM TO SUPPORT INTERNAL CALLING UPON LOSS OF CONNECTION WITH IP CENTREX SERVER

(75) Inventors: Pallavur Sankaranaraynan, Overland Park, KS (US); Brian D. Mauer, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 883 days.

(21) Appl. No.: 10/789,766

(22) Filed: Feb. 27, 2004

(51) Int. Cl.
*G01R 31/08* (2006.01)

(52) U.S. Cl. .................. 370/225; 370/216; 370/228; 370/310; 455/403; 455/426.2; 455/14

(58) Field of Classification Search ......... 370/216–218, 370/225, 228, 310, 912–930; 455/403, 404.1, 455/426.2, 14, 550.1, 554.1, 554.2, 555
See application file for complete search history.

(56) References Cited

U.S. PATENT DOCUMENTS

| | | | | |
|---|---|---|---|---|
| 4,802,199 | A * | 1/1989 | Lange et al. ............ | 379/216.01 |
| 5,517,547 | A * | 5/1996 | Ladha et al. ................... | 379/40 |
| 5,751,789 | A * | 5/1998 | Farris et al. .............. | 379/32.04 |
| 5,873,040 | A * | 2/1999 | Dunn et al. .............. | 455/456.2 |
| 5,912,963 | A * | 6/1999 | Begeja et al. .......... | 379/221.01 |
| 6,215,790 | B1 * | 4/2001 | Voit et al. .................... | 370/401 |
| 6,223,054 | B1 * | 4/2001 | Katko ........................ | 455/554.2 |
| 6,411,802 | B1 * | 6/2002 | Cardina et al. .............. | 455/424 |
| 6,681,118 | B2 * | 1/2004 | Raffel et al. ............. | 455/552.1 |
| 6,757,269 | B2 * | 6/2004 | Dorenbosch et al. ........ | 370/338 |
| 6,757,528 | B1 * | 6/2004 | Cardina et al. ........... | 455/426.2 |
| 7,035,633 | B2 * | 4/2006 | Kirkpatrick .............. | 455/426.1 |
| 7,053,768 | B2 * | 5/2006 | Seshadri ..................... | 340/531 |
| 7,085,551 | B1 * | 8/2006 | Bonner et al. ............ | 455/404.1 |
| 2002/0120759 | A1 * | 8/2002 | Faccin et al. ................ | 709/230 |
| 2002/0131395 | A1 * | 9/2002 | Wang ......................... | 370/349 |
| 2002/0150083 | A1 * | 10/2002 | Fangman et al. ........... | 370/352 |
| 2002/0151302 | A1 | 10/2002 | Schmidt et al. | |
| 2002/0193107 | A1 * | 12/2002 | Nascimento, Jr. .......... | 455/426 |
| 2003/0181202 | A1 * | 9/2003 | Link et al. ................. | 455/417 |
| 2004/0033786 | A1 * | 2/2004 | Kirkpatrick ............... | 455/74.1 |

(Continued)

OTHER PUBLICATIONS

Scott Stamp, "IP Centrex Creates new Opportunities for Equipment Manufacturers," Telcordia Technologies, Inc., 2001.

(Continued)

*Primary Examiner*—Aung S Moe
*Assistant Examiner*—Curtis A Alia

(57) ABSTRACT

A method and system for facilitating calling within an enterprise network upon failure of a landline connection between the enterprise network and an outside call server such as an IP Centrex server. Upon failure of the landline connection, an enterprise router switches over to a backup wireless packet-data link, such as a 3G cellular link for instance. Thus, packet-based call signaling can continue to flow between the enterprise network and the call server so as to continue setting up inside calls between enterprise telephone stations. The backup wireless packet-data link can also be used to carry a limited extent of outside calls, such as emergency calls for instance.

18 Claims, 5 Drawing Sheets

U.S. PATENT DOCUMENTS

2004/0121726 A1* 6/2004 Bifano et al. .................. 455/8
2004/0246983 A1* 12/2004 Kaatz ........................ 370/432
2005/0021868 A1* 1/2005 Sharma et al. ............... 709/249
2005/0174935 A1* 8/2005 Segel ........................ 370/228
2005/0180317 A1* 8/2005 Shimada .................... 370/217
2005/0286690 A1* 12/2005 Thommana et al. .... 379/114.01

OTHER PUBLICATIONS

Ian Angus, "Centrex Versus PBX: A new Look at an Old Debate," Telemanagement #184, Apr. 2001.

* cited by examiner

METHOD AND SYSTEM TO SUPPORT INTERNAL CALLING UPON LOSS OF CONNECTION WITH IP CENTREX SERVER

BACKGROUND

1. Field of the Invention

The present invention relates to telecommunications and, more particularly, to telephone networks served by an external call server such as an IP Centrex server for instance.

2. Description of Related Art

Many enterprise phone systems today include a private branch exchange (PBX) server to support calling between telephone stations. In effect, a PBX server is a private version of a telephone company central switching office (exchange). Typically, the PBX server connects by respective telephone lines to all of the telephone stations in the system and by a PBX trunk to the local central office. The PBX server then allows connected telephone stations to call each other and to place and receive calls on the public switched telephone network (PSTN) via the central office. Further, a PBX server typically provides the telephone stations with enhanced calling features, such as abbreviated (e.g., extension) dialing, intercom service, call forwarding, call transfer, call restrictions, and conference calling.

As an alternative to PBX service, many local telephone companies now offer a "Centrex" service. In effect, Centrex is a single-line telephone service that provides each line in an enterprise with all of the "bells and whistles" commonly found in an enterprise PBX system. With Centrex, each enterprise telephone station is connected by a respective telephone line to the telephone company central office. There, a Centrex server provides each enterprise telephone line with the same sorts of enhanced calling features that a PBX server could provide, such as abbreviated dialing, intercom service, call forwarding, call transfer, call restrictions, and conference calling, for instance.

Centrex service has several advantages compared with PBX service. For one, Centrex service is typically cheaper to install than PBX service, because the central office switching infrastructure already exists. Further, a Centrex server can easily serve multiple locations of a given enterprise at once, whereas PBX service would require a dedicated line to tie together the various locations. And still further, Centrex service provides each enterprise telephone station with a direct dial (outside) line, whereas PBX service typically offers just a limited number of outside lines to be shared among all of the PBX extensions.

On the other hand, Centrex service has a significant downside, in that each telephone station needs to be connected by a respective telephone line with the central office. This means that each time someone new joins the enterprise, the enterprise must arrange with the telephone company to install telephone line to the new employee's desk. Unfortunately, this can take a lot of time and, in some scenarios, can be very expensive and difficult to accomplish.

To solve this problem, some carriers have begun to offer an improved version of Centrex service known as "IP Centrex." In a typical IP Centrex system, an enterprise telephone network is coupled through one or more routers or gateways with an IP wide area network (WAN) (e.g., the Internet) on which an IP Centrex server resides, and the IP WAN is then coupled via one or more gateways with the PSTN. With this arrangement, packet-based call setup signaling will flow between the enterprise network and the IP Centrex server, to allow the IP Centrex server to set up calls between telephone stations within the enterprise, as well as calls between enterprise telephone stations and the PSTN.

In operation, for instance, when a user in the enterprise dials an extension of another user in the enterprise, the calling station (or a suitable gateway) may send a packet-based call-setup message (e.g., a "SIP" signaling message) via the IP WAN to the IP Centrex server, seeking to set up the call to the dialed extension. The IP Centrex server may then engage in packet-based signaling communication with the calling and called stations, to set up the call between the two stations. Similarly, when a user in the enterprise dials an outside number, the IP Centrex server may responsively set up the call over a bearer path that includes the enterprise network, the IP WAN, and the PSTN.

A significant benefit of IP Centrex service is that the enterprise only needs to have a single broadband connection with the IP WAN, rather than having to couple each telephone station by a respective line to the telephone company central office. However, with this benefit also comes a significant risk: if the enterprise network loses its connection with the IP WAN, such as if a critical router or link between the enterprise network and the IP WAN fails, the enterprise telephone system will no longer work. In particular, enterprise users will no longer bet able to set up calls via the PSTN. But even worse, enterprise users will no longer be able to set up calls with each other, since the entity that sets up their calls would be unreachable.

SUMMARY

The present invention solves this problem by providing a wireless WAN (WWAN) backup link, such as a cellular packet-data link, for call setup signaling between the enterprise network and the IP WAN. Through use of the WWAN backup link, enterprise telephone stations can thus continue to engage in normal call setup signaling with the IP Centrex server, so that calling within the enterprise can continue unabated.

To implement the invention, a node that connects the enterprise network with the IP WAN can be set to detect when its normal route to the IP WAN goes down and to then responsively begin using a WWAN link instead. The WWAN link will support wireless packet-data communications between the enterprise network and the IP WAN. Therefore, packet-based call setup signaling can continue to flow as normal between the enterprise network and the IP Centrex server, so as to allow continued calling between telephone stations within the enterprise.

As presently contemplated, an exemplary embodiment of the invention may take the form of a method or system for providing a WWAN backup link so as to facilitate continued intra-enterprise calling.

As a method, for instance, the exemplary embodiment may include the functions of (i) detecting failure of the landline connection between the enterprise network and the packet-switched network and (ii) responsively invoking a WWAN connection between the enterprise network and the packet-switched network so as to allow continued passage of the packet-based signaling between the enterprise network and the IP Centrex server to set up calls inside the enterprise network between the enterprise telephone stations.

And as a system, for instance, the exemplary embodiment may include (i) a WWAN modem for providing a WWAN backup link between the enterprise network and the packet-switched network and (ii) routing logic, operable upon failure of the landline connection, to route the packet-based signaling via the WWAN backup link between the enterprise network and the packet-switched network, so as to allow continued setup of calls inside the enterprise network between the enterprise telephone stations.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

DETAILED DESCRIPTION OF AN EXEMPLARY EMBODIMENT

Figure 1:
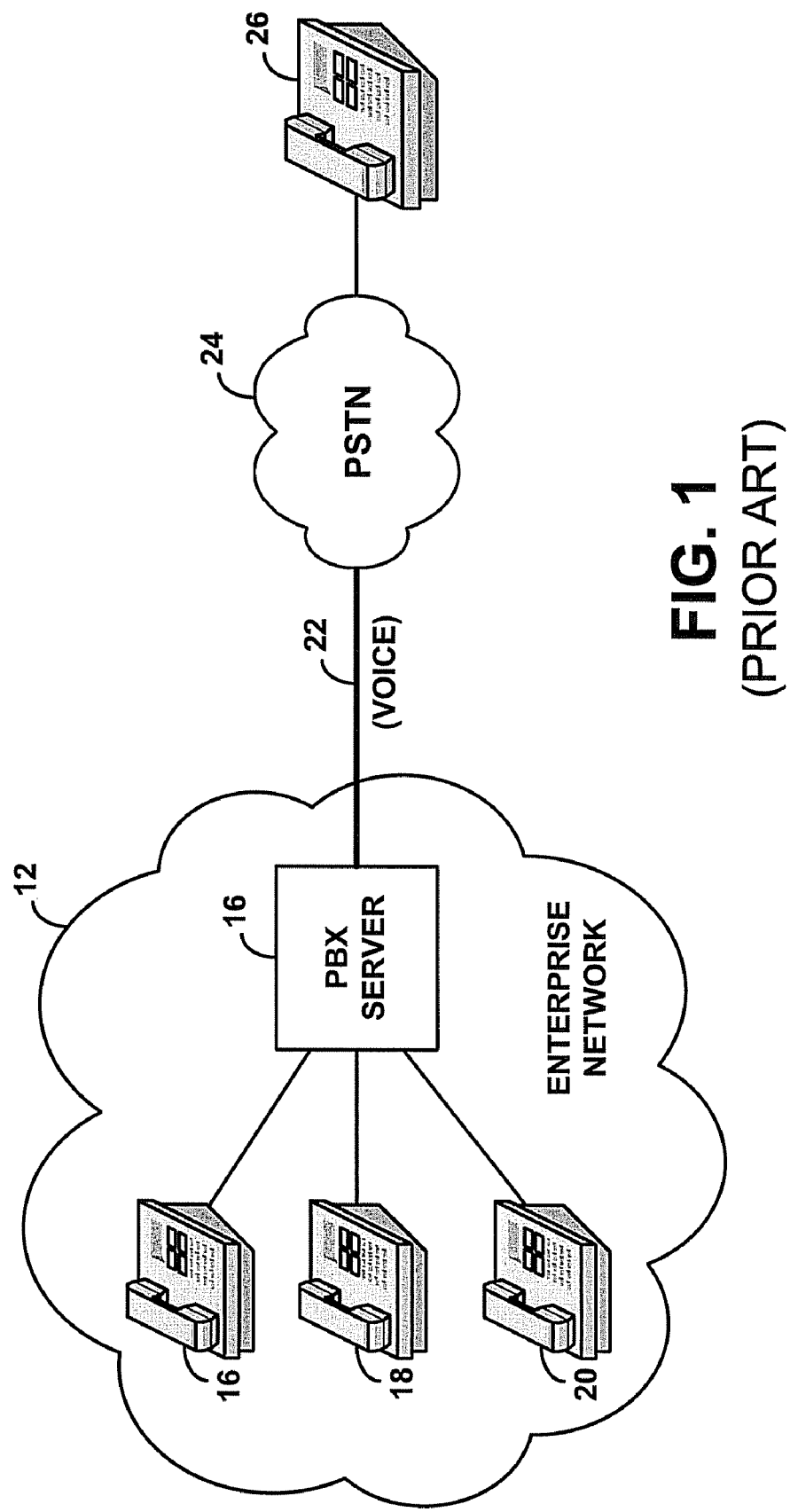
FIG. 1 is a block diagram of a prior art PBX arrangement.

Referring to the drawings, FIG. 1 first depicts an example of a prior art PBX based system, by way of comparison. As shown in FIG. 1, an enterprise network 12 includes a PBX server 14 that provides connectivity between a plurality of enterprise telephone stations, such as stations 16, 18 and 20 for instance. (The telephone stations could be telephones, fax machines, modems, or other telephony devices.) The PBX server 14 then includes a landline connection 22, whether circuit-switched or packet-switched, to the PSTN 24, and the PSTN 24 provides connectivity to remote telephone stations such as station 26.

With this arrangement, the enterprise telephone stations can place both inside and outside calls by signaling through the PBX server. For instance, station 16 can call station 18 by dialing the extension of station 18, and the PBX server would responsively ring station 18 and connect the call between the two stations. Similarly, station 16 can call remote station 26 by acquiring an outside line through PBX server 14 and dialing the telephone number of the remote station 26 to establish a call via landline connection 22.

In this arrangement, if the landline connection 22 fails, the enterprise telephone stations would no longer be able to place and receive outside calls via the PSTN 24, due to the loss of bearer path connectivity. However, the enterprise telephone stations would still be able to call each other, since the PBX server 14 would still be in place to set up and connect those inside calls.

Figure 2:
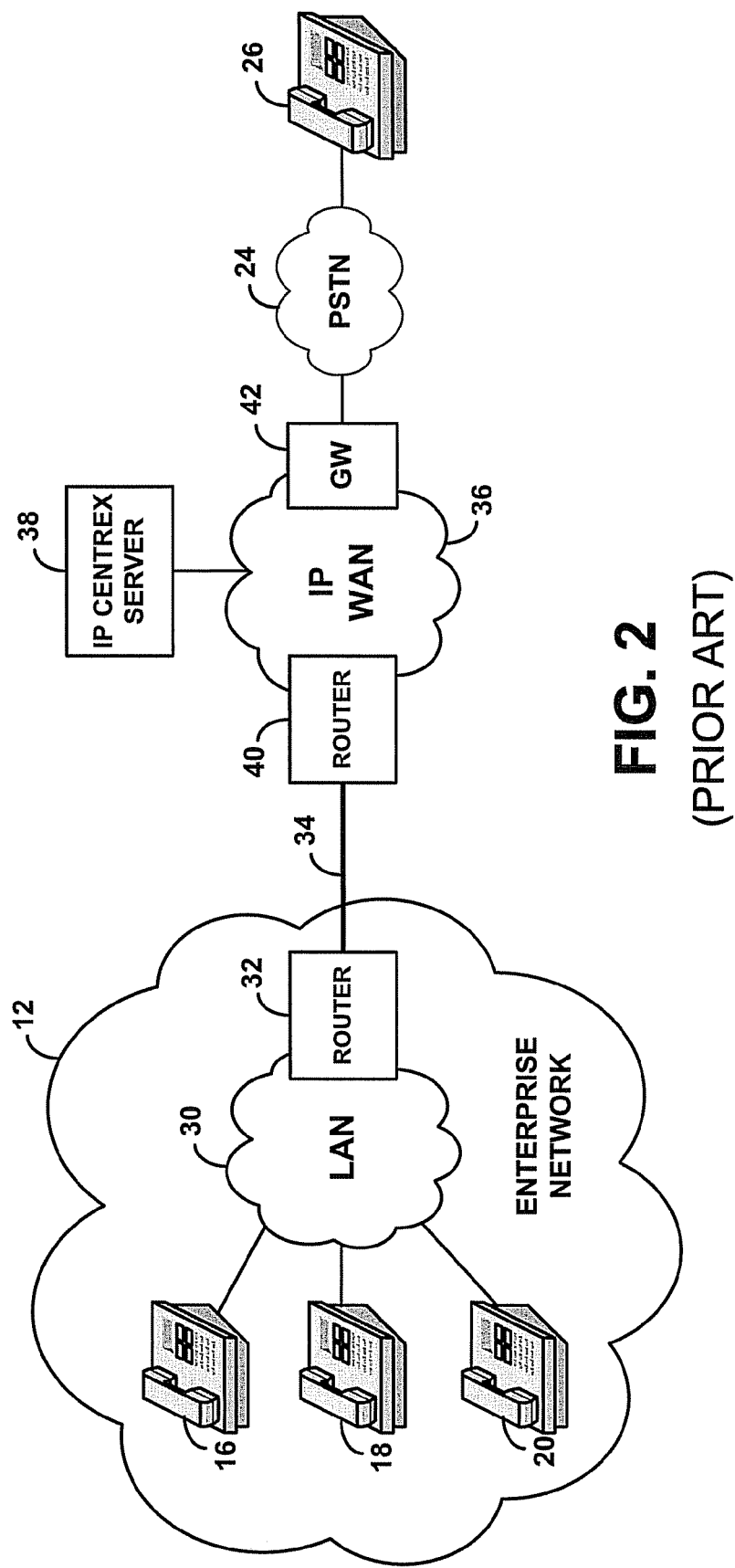
FIGS. 2 and 3 are block diagrams of a prior art IP Centrex arrangement.

Turning next to FIG. 2, a prior art IP Centrex arrangement is shown. In this IP Centrex arrangement, the enterprise network 12 includes or takes the form of a local area network (LAN) 30 of the type that might provide connectivity between computer workstations in the enterprise. Conventionally, the LAN 30 includes or is coupled with a router 32 that has a landline connection 34 (e.g., a T1 line) with an IP WAN 36 on which an IP Centrex server 38 (or other call server) resides. In particular, the landline connection 34 could extend to another router 40 at the IP WAN, which functions to route packet data within the IP WAN. IP Centrex server 38 may then sit at a defined IP address on the IP WAN 36. Further, the IP WAN 36 may also include or be connected with a gateway (e.g., media gateway) 42 to the PSTN 24.

In this arrangement, each of the enterprise telephone stations can be an IP telephony device that has an IP address on the enterprise LAN 30. Thus, the stations can engage in telephone communications with each other over bearer paths within the LAN 30. For instance, stations 16 and 18 can engage in an IP telephony call by exchanging voice or other media using the Real-Time Transport Protocol (RTP), as described in Schulzrinne, et al., "RTP: A Transport Protocol for Real-Time Applications," Request for Comments 1889 (January 1996), which is incorporated herein by reference. Further, the stations can engage in telephone communications over the IP WAN 36, such as with other IP telephony devices on the IP WAN, or via gateway 42 and PSTN 24 with other telephony devices such as remote station 26.

In the IP Centrex arrangement, IP Centrex server 38 functions to set up calls between the enterprise telephone stations (i.e., inside calls, with bearer paths within the enterprise network 12) and may also function to set up calls between the enterprise telephone stations and other stations (i.e., outside calls, with bearer paths extending through the IP WAN 36). To set up and manage these calls, the IP Centrex server 38 engages in packet-based signaling with the enterprise telephone stations.

The packet-based signaling can comply with any agreed protocol. By way of example, suitable packet-based signaling protocols include H.323, SIP and SIP-T. Relevant aspects of H.323 are described in "Packet Based Multi-media Communications Systems," ITU-T Recommendation H.323 (July 2003), which is incorporated herein by reference. Relevant aspects of SIP are described in Rosenberg, et al., "SIP: Session Initiation Protocol," Request for Comments 3261 (June 2002), which is incorporated herein by reference. And relevant aspects of SIP-T are described in Vemuri, et al., "Session Initiation Protocol for Telephones (SIP-T): Context and Architectures," Request for Comments 3372 (September 2002), which is incorporated herein by reference. Further, SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is also incorporated herein by reference. Other packet-based signaling protocols, now known or later developed, could be used as well.

Under SIP, for instance, each entity involved with call setup is programmed with a SIP "user agent" application and has an assigned "SIP address." (The SIP address could be associated with a user or a device.) When an entity goes online, the entity registers with a SIP registration server, to provide the server with a correlation between the entity's SIP address and the entity's IP (network) address. That way, when a SIP message is destined to a particular SIP address, a SIP proxy server can query the registration server to determine the IP address to which the SIP message should be routed and can then direct or route the SIP message to that IP address.

SIP defines a basic message-exchange that entities can use to set up a packet-based media session (i.e., a "call"). An initiating entity starts the process by sending to the SIP address of a terminating entity a SIP "INVITE" message, which includes an SDP block describing the type of media session desired, such as an indication that the desired session will be carried as RTP, using a particular vocoder or other media codec, for instance. A SIP proxy server would then query a SIP registration server to determine the IP address corresponding to the target SIP address and would route the SIP INVITE to that IP address. In turn, if the terminating entity agrees to participate in the session, the terminating entity would respond with a SIP "200 OK" message. And the initiating entity would then complete setup of the call by sending a SIP "ACK" message. The entities may then begin to exchange media with each other as described.

SIP can also be used in a "third party call control" arrangement, in which a controlling entity such as an application server engages in SIP signaling respectively with two or more parties in order to set up a call between those parties.

In an exemplary IP Centrex arrangement, the IP Centrex server 38 itself could be configured to function as a SIP registration/proxy server and also as a third party call control server to set up calls for enterprise telephone stations. To accomplish this, each telephone station may have both a static SIP address and a dynamically assigned SIP address. The IP Centrex server, as SIP registration server, would then correlate each station's static SIP address with the an IP address of the IP Centrex server, so that the IP Centrex server would receive a SIP INVITE destined to the station's static SIP address. On the other hand, the IP Centrex server would correlate each station's dynamic SIP address with the station's actual IP address, i.e., on LAN 30. That way, the IP Centrex server can send a SIP message to the station itself by sending the message to the station's static SIP address.

By way of example, assume that station 16 has the static SIP address "station16@centrex.com" and the dynamic SIP address "station16@enterprise.com," and assume that station 18 has the static SIP address "station18@centrex.com" and the dynamic SIP address "station18@enterprise.com." Further, assume that the IP address of station 16 is 10.10.10.7 and the IP address of station 18 is 10.10.10.8.

To place a call to station 18, station 16 may send a SIP INVITE to station 18's static SIP address, from station 16's static IP address. Such a SIP INVITE may appear, in part, as follows:

INVITE sip:station18@centrex.com
From: sip:station16@centrex.com
Contact: sip:station16@enterprise.com
. . .
c=IN 10.10.10.7

This INVITE is directed to station 18's static SIP address, "station18@centrex.com," and is from station 16's static SIP address, "station16@centrex.com." Further, the INVITE designates station 16's dynamic SIP address, "station16@enterprise.com," as the contact address to which any response should be sent. And the INVITE includes an SDP block (represented in part by ellipses) that describes the desired session (e.g., as a VoIP session) and indicates the IP address of station 16 for use in the session.

In response, the IP Centrex server may then send a SIP INVITE to the dynamic address of station 18, i.e., for receipt by station 18. Such an INVITE might appear as follows:

INVITE sip:station18@enterprise.com:5060
From: sip:station16@centrex.com
Contact: sip:enterprise.com
. . .
c=IN 10.10.10.7

This INVITE is directed to port 5060 at the dynamic SIP address of station 18, and the INVITE comes from station 16's static SIP address (i.e., from the IP Centrex server). Further, the INVITE lists the IP Centrex server as a contact address for any response, and the INVITE provides station 18 with the SDP session information provided by station 16.

When station 18 answers the call, station 18 may then send to the IP Centrex server a SIP 200 OK message, which would have an SDP block providing information including station 18's IP address for use during the session. In turn, the IP Centrex server may then send a SIP 200 OK message to the static SIP address of station 16, forwarding the SDP block including station 18's IP address. After station 16 sends a SIP ACK to the IP Centrex server and the IP Centrex server sends a SIP ACK in turn to station 18, stations 16 and 18 can then begin engaging in the designated session with each other within the enterprise LAN.

Similarly, IP Centrex server 38 can engage in SIP signaling with an enterprise telephone station to set up an outside call between the enterprise telephone station and a station on PSTN 24. To accomplish this, IP Centrex server 38 may engage in SIP signaling (or another sort of call setup signaling) with gateway 42, and gateway 42 may engage in more traditional call setup signaling (such as "ISUP" signaling) to set up the call with station 24 over the PSTN.

For example, when station 16 calls remote station 26 by dialing a telephone number such as 555-5526, station 26 may send to the IP Centrex server 38 a SIP INVITE that designates the phone number of station 24. In response, the IP Centrex server may then send a SIP INVITE from station 16's static SIP address to gateway 42. Gateway 42 may then convert the SIP INVITE into an ISUP Initial Address Message (IAM) and send the IAM to a PSTN switch in an effort to set up the call with station 24. Once station 24 answers, a call path between station 16 and station 16 would be established, spanning (i) the enterprise LAN 30, landline connection 34, and IP WAN 36 as packet-data (e.g., RTP) and (ii) the PSTN 24 over a dedicated circuit.

A similar process could be applied to facilitate connection of incoming outside calls to an enterprise telephone stations. For instance, when station 24 calls station 16, gateway 42 may send a SIP INVITE to station 16's static SIP address at the IP Centrex server 38, and the IP Centrex server may in turn signal with station 16 to set up the call.

Note that the arrangement shown in FIG. 2 is just an example. Other IP Centrex arrangements are also possible. As one variation, for instance, some or all of the enterprise telephone stations could be more traditional, circuit-switched telephony devices rather than IP telephony devices. This variation is illustrated in FIG. 3.

Figure 3:
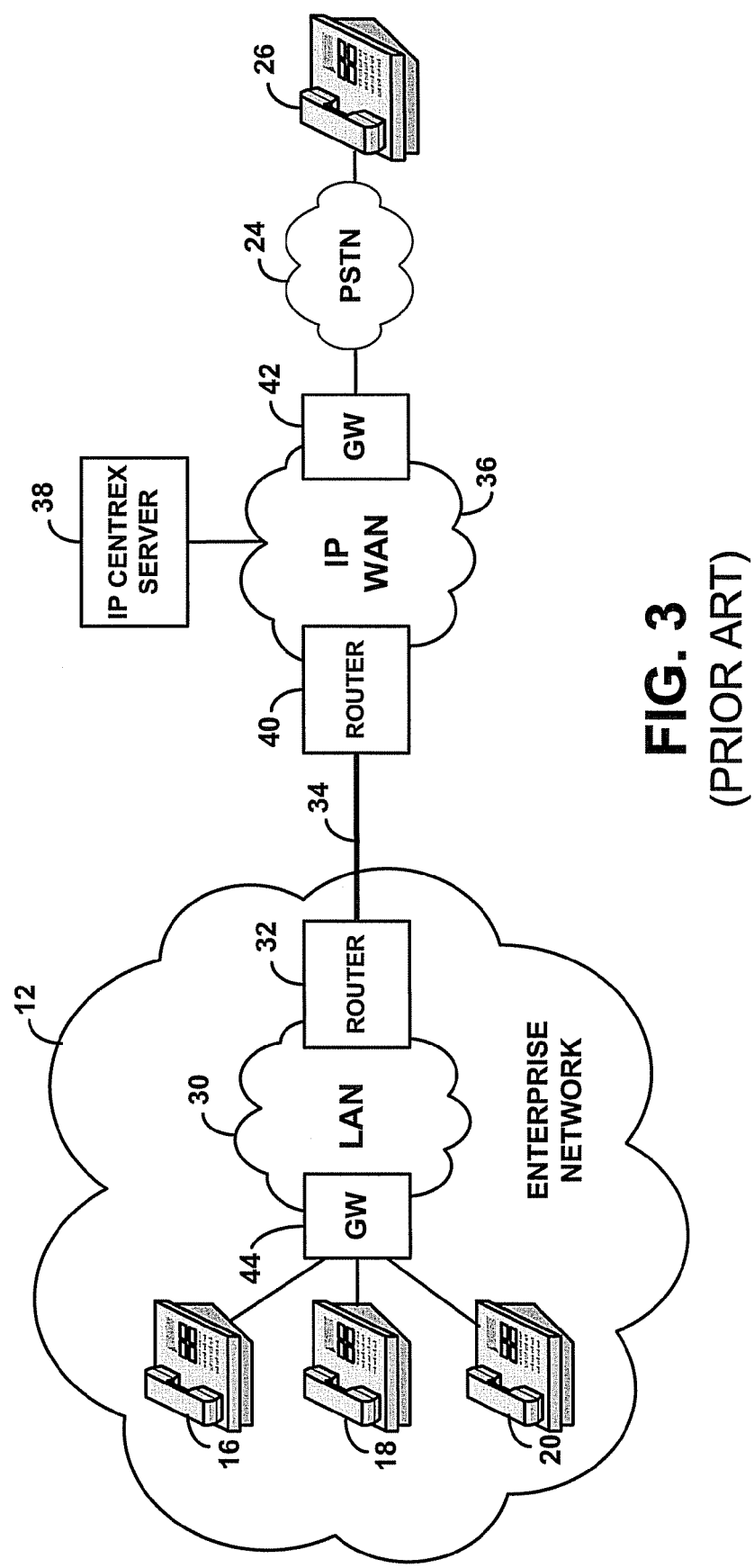

The arrangement of FIG. 3 is largely the same as the arrangement of FIG. 2, except that a gateway 44 sits on the enterprise LAN 30 and serves as a circuit/packet interface for legacy enterprise telephone stations. Each enterprise telephone station is coupled by a telephone line to the gateway 44, and the gateway 44 then provides connectivity with the LAN 30.

With this arrangement, the gateway 44 can be arranged to convert between legacy call setup signaling with the stations and packet-based call setup signaling with IP Centrex server 38, similarly to how gateway 42 can convert between such signaling for communications over the PSTN 24. For instance, when station 16 calls station 18, station 16 may send a legacy call-setup signal (e.g., in a proprietary format) to gateway 44, and gateway 44 may convert the signal into a SIP INVITE and send the INVITE to IP Centrex server 38. IP Centrex server 38 may then responsively send a SIP INVITE to gateway 44, inviting station 18 to participate in the call, and gateway 44 may in turn send a legacy call setup signal to station 18 to cause station 18 to ring. When station 18 answers, after additional SIP signaling with the IP Centrex server 38, gateway 44 may then connect together the lines from stations 16 and 18, to complete setup of the call between the stations.

Note also that a combination of the arrangements shown in FIGS. 2 and 3 is also possible. For instance, some of the enterprise telephone stations could be IP telephony devices that can themselves engage in packet-based call setup signaling with the IP Centrex server, and others can be legacy telephony devices on behalf of which gateway 44 engages in packet-based call setup signaling with the IP Centrex server. Still other arrangements are possible as well.

As noted above, if the landline connection 34 between the enterprise network 12 and the IP WAN fails in this IP Centrex arrangement, the enterprise telephone stations would no longer be able to place and receive outside calls via the PSTN, since the bearer path for those calls through the IP WAN would be gone. But, perhaps more troublesome, the enterprise telephone stations would also no longer be able to call each other, since the signaling path between the enterprise network and the IP Centrex server would be gone.

In accordance with the exemplary embodiment, a solution to this problem is to provide a wireless WAN backup connection between the enterprise network 12 and the IP WAN, and to invoke the WWAN backup connection when the landline connection 34 fails. Packet-based call setup signaling can then flow via the WWAN backup connection between the enterprise network and the IP Centrex server 38, so as to facilitate continued setup of calls within the enterprise network. Further, the WWAN backup connection can also be used to carry a limited extent of call traffic (bearer traffic) for calls between the enterprise network and the PSTN, such as emergency service calls for instance.

Figure 4:
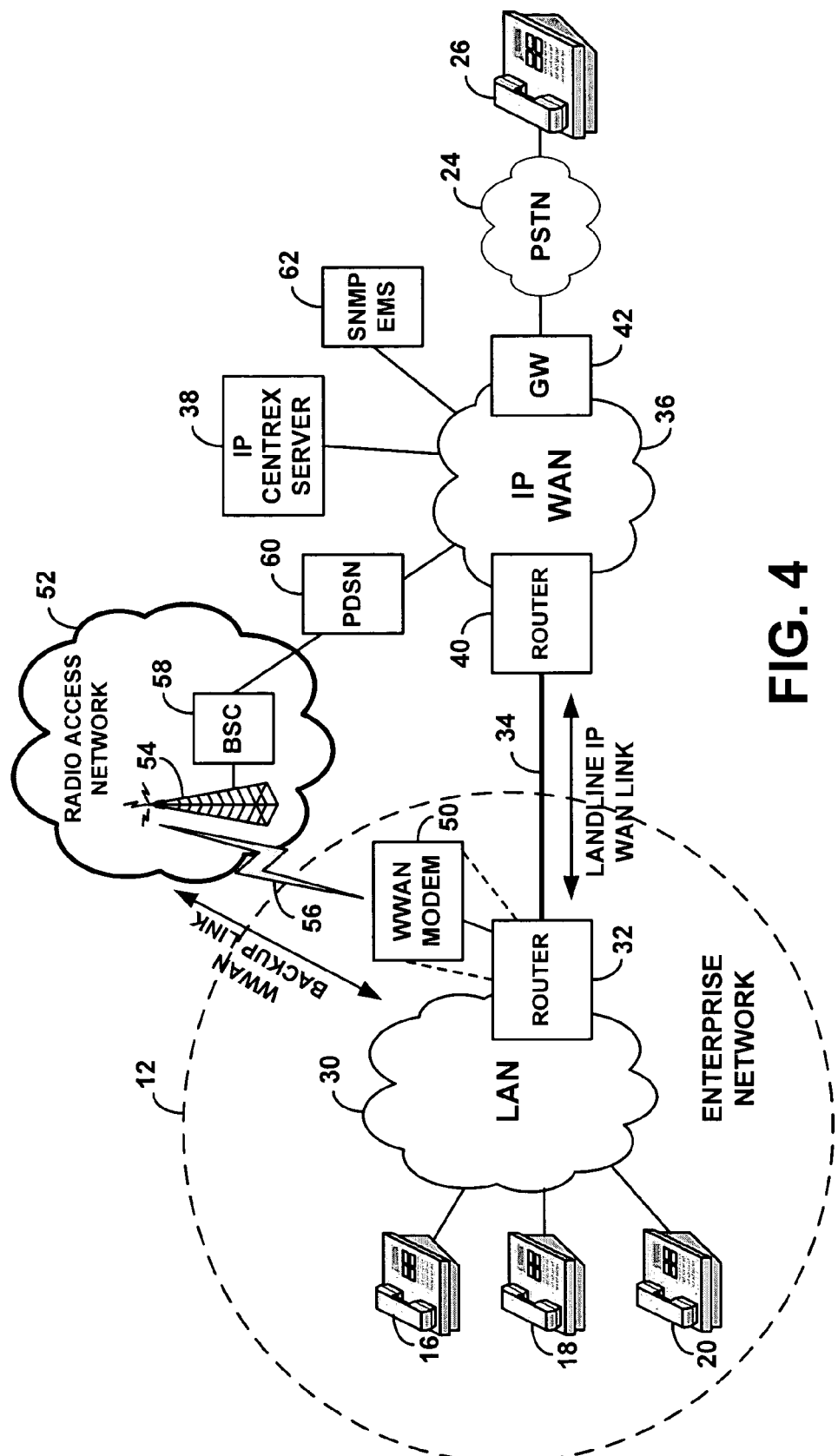
FIG. 4 is a block diagram of an IP Centrex arrangement modified to include a WWAN backup link between an enterprise network and an IP WAN, in accordance with the exemplary embodiment.

FIG. 4 depicts a variation of the arrangement shown in FIG. 2, to illustrate an example of how the invention can be carried out in practice. As shown in FIG. 4, enterprise router 32 includes or is connected with a WWAN modem, which is configured to establish packet-data connectivity with IP WAN 36 via a cellular radio access network (RAN) 52 of the type provided by Sprint Spectrum LP for instance.

RAN 52 can take a variety of forms. As shown in FIG. 4, for instance, the RAN 52 can include a base transceiver station (BTS) 54 that radiates to define a radio frequency (RF) air interface 56 through which cellular wireless devices can communicate. The BTS 54 may then be controlled by a base station controller (BSC) 58. And the BSC 58 may be coupled with a gateway such as a packet data serving node (PDSN) 60, which provides connectivity with the IP WAN 36, or that provides connectivity with one or more intermediate packet-data networks coupled with the IP WAN 36. Other arrangements of RAN 52 are possible as well.

RAN 52 can be arranged to support wireless communication and packet-data connectivity according to any of a variety of protocols, such as CDMA, TDMA or GSM for instance. In a preferred embodiment, for example, the RAN 52 will operate according to the well known cdma2000 protocol, as described in EIA/TIA/IS-2000 Series, Rev. A (published March 2000), which is incorporated herein by reference.

In this embodiment, WWAN modem 50 would then be a cellular wireless device also compliant with cdma2000, so that WWAN modem 50 can establish wireless packet-data connectivity with IP WAN 36 via RAN 52. Examples of WWAN modems with this capability include (i) the Multi-Modem CDMA Wireless Modem, made by Multi-Tech Systems, Inc. of Mounds View, Minn., and (ii) the Sierra Wireless EM3400 embedded wireless modem, made by Sierra Wireless Inc. of Richmond, British Columbia, Canada.

For optimal coverage, the WWAN modem can be connected with an external antenna, such as a rooftop-mounted antenna or diversity antenna arrangement. Further, wireless signal repeaters could be employed to boost the strength of communications between the WWAN modem 50 and BTS 54. Still further, to increase bandwidth over the WWAN link, multiple WWAN modems could be combined in parallel, and data traffic could be multiplexed among multiple WWAN links between the enterprise network and the IP WAN.

As presently contemplated, the WWAN modem 50 can be integrated within router 32 or can be coupled externally to the router, through an Ethernet connection or through LAN 30 for instance. The WWAN modem 50 can have an "always-on" wireless packet-data connection that it acquires initially upon power up, or it can acquire wireless packet-data connectivity in response to receiving packet data from router 32 to transmit onto IP WAN 36. Thus, when router 32 provides the WWAN modem 50 with packet data to send to IP WAN 36, WWAN modem 50 can readily do so.

Under cdma2000, in order to establish wireless packet-data connectivity, WWAN modem 50 would send an origination request to a mobile switching center (MSC) (not shown) over a common access channel on air interface 56, providing the MSC with a "packet-data" service option code. In response to the packet-data service option code, the MSC would then forward the request to BSC 58, and BSC 58 would assign the WWAN modem 50 to operate on a traffic channel over the air interface. BSC 58 would also signal to PDSN 60, and PDSN 60 and the WWAN modem 50 would then negotiate with each other to establish a data link connection, such as a point-to-point protocol (PPP) link, for instance. Further, PDSN 60 (in cooperation with other entities (not shown)), would assign a mobile-IP address to WWAN modem 50 for use in communicating over IP WAN 36. WWAN modem 50 can then engage in IP communication over IP WAN 36 just like any other node on the IP WAN, albeit through a WWAN connection.

Once WWAN modem 50 acquires packet-data connectivity in this manner, it may periodically reregister with the PDSN so as to maintain its mobile-IP address. After a certain time during which no packet-data flows over the WWAN modem's assigned traffic channel, however, the BSC 58 may release the traffic channel, which would put the WWAN modem in a "dormant" state. To then send or receive packet-data, the WWAN would then ask the BSC 58 to newly assign a traffic channel, so as to move the WWAN modem into an active state.

Note that the WWAN backup connection between enterprise network 12 and IP WAN 36 can take various other forms as well. As one other example, for instance, both enterprise router 32 and a router on the IP WAN 36 can be provided with respective WWAN connections, such as through respective WWAN modems. The two routers can then exchange packet data through their respective WWAN connections. Other examples are possible as well.

Figure 5:
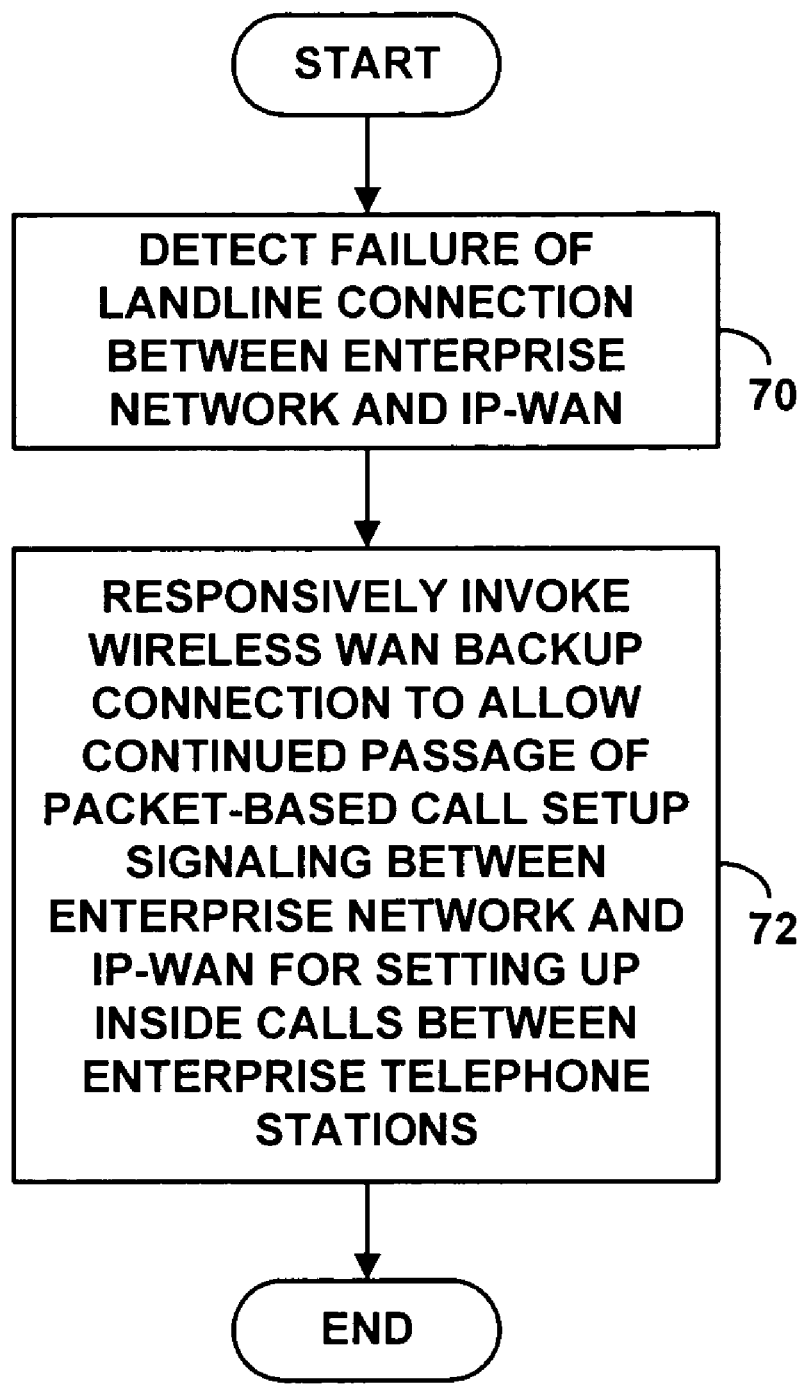
FIG. 5 is a flow chart depicting functions that can be carried out in accordance with the exemplary embodiment.

According to the exemplary embodiment, enterprise router 32 will be configured to route packet-based call setup signaling via the WWAN backup connection in the event its landline connection 34 with the IP WAN fails, so that packet-based call setup signaling can continue to flow between the enterprise network 12 and the IP Centrex server 38. FIG. 5 is a flow chart depicting an example of how this process can work in practice.

As shown in FIG. 5, at block 70, router 32 first detects a failure of landline connection 34. For example, applying the well known Routing Information Protocol (RIP) routing algorithm, router 32 would normally receive periodic update messages from an adjacent router on the landline connection 34; when router 32 stops receiving those update messages, router 32 may programmatically conclude that its link with that adjacent router has become unavailable. As another example, router 32 may normally receive a heartbeat at the physical layer, confirming the presence of the physical landline connection; when router 32 stops receiving that heartbeat, router 32 may programmatically conclude that the physical connection has become unavailable. Other examples are possible as well.

At block 72, in response to the determination that landline connection 34 has failed, router 32 will then invoke the WWAN backup connection, so as to allow continued passage of packet-based signaling between the enterprise network and the IP Centrex server for setting up calls inside the enterprise network between the enterprise telephone stations. The function of invoking the WWAN backup connection can itself take various forms, such as (i) establishing the WWAN backup connection, (ii) switching over to use the WWAN backup connection, and/or (iii) using the WWAN backup connection.

In the exemplary embodiment, for instance, router 32 can have routing-logic comprising a routing table that lists at least two static routes, including a primary static route over landline connection 34 and a secondary static route over the WWAN backup connection, i.e., via WWAN modem 50. The routing table can list the landline route as being the least cost route, and the WWAN route as being the second best route. That way, the router 32 will use the landline route if possible. And when the landline route becomes unavailable, the router 32 will switch over to begin using the WWAN route instead.

In operation, when router 32 receives a data packet destined to IP WAN, if the landline route is unavailable, router 32 would responsively pass the data packet to WWAN modem 50 for transmission via the WWAN to IP WAN 36. If WWAN modem 50 has already acquired wireless packet-data connectivity, WWAN modem 50 can then send the data packet to IP WAN 36. Alternatively, if WWAN modem 50 does not currently have wireless packet-data connectivity, WWAN modem 50 can responsively acquire connectivity and then send the data packet to IP WAN 36.

Thus, by way of example, assume that landline connection 34 is unavailable and station 16 tries to call station 18. When that happens, router 32 may receive packet data transmitted from station 16, carrying a SIP INVITE destined for station 18's static SIP address at IP Centrex server 38. Router may then pass that packet data to WWAN modem 50, and WWAN modem 50 would transmit the packet data over the WWAN to IP WAN 36, where it would then be transmitted through normal SIP routing procedures to IP Centrex server 38. Further packet-based signaling would then occur, such as described above, so as to complete setup of the inside call between stations 16 and 18. And upon completion of the call setup, stations 16 and 18 may then commence the call via LAN 30.

According to the exemplary embodiment, the main purpose of the WWAN backup connection is to provide a path for continued packet-based call setup signaling between the enterprise network 12 and the IP Centrex server 38. Although the landline connection 34 will likely have capacity to carry such call setup signaling and also multiple concurrent outside calls (bearer data), the WWAN backup connection will likely (although not necessarily) have a much more limited capacity. Although the capacity of the WWAN connection should be sufficient to support call setup signaling, the capacity might be insufficient to also carry multiple concurrent outside calls.

As presently contemplated, one way to handle this situation is for the IP Centrex server (or another entity) to limit the extent of outside calls permitted over the WWAN connection. For instance, the IP Centrex server could bar all outside calls over the WWAN connection, or the IP Centrex server could bar all but certain designated outside calls, such as emergency service calls (e.g., 911 calls), for instance.

In this regard, IP WAN 36 may include a Simple Network Management Protocol (SNMP) Element Management System (EMS) 62, as shown in FIG. 4. When router 32 detects that its primary route (the landline connection) is unavailable, router 32 may send a conventional "route inaccessible" message (over the WWAN connection) to the SNMP EMS 62, reporting that the route is down. When the SNMP EMS 62 learns of that change in routing paths, it may then programmatically notify the IP Centrex server 38 (e.g. using CORBA or another designated API). In response IP Centrex server 38 would then apply logic to begin restricting outside calling for the enterprise network 12, such as by allowing only calls to the phone number "911" for instance.

Finally, when the landline connection 34 comes back up, router 32 may detect the availability of the landline connection and may begin routing packet-data over the landline connection as normal. Further, router 32 may also send a message to SNMP EMS 62, indicating that the primary route is available, and SNMP EMS 62 may notify IP Centrex server accordingly. IP Centrex server may then release any extra restrictions on outside calling that it had applied when the WWAN connection was in use.

An exemplary embodiment of the present invention has been described above. Those skilled in the art will understand, however, that changes and modifications may be made to the embodiment described without departing from the true scope and spirit of the invention, which is defined by the claims.

What is claimed is:

1. A method operable within a system of the type in which an enterprise network provides connectivity between a plurality of enterprise telephone stations, wherein a landline connection extends between the enterprise network and a packet-switched network, and wherein a call server sits on the packet-switched network and engages in packet-based signaling with the enterprise network to set up calls inside the enterprise network between the enterprise telephone stations, the method comprising:

detecting failure of the landline connection; and in response to detecting failure of the landline connection,
(a) invoking a wireless wide area network (WWAN) connection between the enterprise network and the packet-switched network to allow continued passage of the packet-based signaling between the enterprise network and the call server to set up calls having bearer paths within the enterprise network between the enterprise telephone stations, and (b) at the call server, allowing setup of calls having bearer paths within the enterprise network between the enterprise telephone stations, while preventing setup of all but certain designated calls having bearer paths extending from the enterprise network and through the WWAN connection.

2. The method of claim 1, wherein the WWAN connection comprises a cellular radiocommunication system.

3. The method of claim 1, wherein invoking the WWAN connection comprises using a WWAN modem to acquire connectivity with the packet-switched network.

4. The method of claim 1, wherein the enterprise network includes a router that routes the packet-based signaling to the packet-switched network, and wherein detecting the failure comprises the router detecting the failure.

5. The method of claim 1, wherein the enterprise network includes a router that has a first mode in which the router routes traffic over the landline connection and a second mode in which the router routes traffic over the WWAN connection, and wherein invoking the WWAN connection comprises the router switching from the first mode to the second mode.

6. The method of claim 5, wherein the router is coupled with a WWAN modem, and wherein invoking the WWAN connection comprises the router sending data to the WWAN modem.

7. The method of claim 1, wherein the call server comprises an IP Centrex server.

8. The method of claim 1, wherein the packet-based signaling comprises Session Initiation Protocol (SIP) signaling.

9. The method of claim 1, further comprising:
using the WWAN connection to carry emergency calls between the enterprise network and the packet-switched network.

10. The method of claim 1, wherein restricting outside calling via the WWAN connection comprises:
allowing emergency service calls via the WWAN connection but precluding other outside calls via the WWAN connection.

11. An improvement to a system of the type comprising an enterprise network that provides connectivity between a plurality of enterprise telephone stations, wherein the enterprise network is coupled by a landline connection with a packet-switched network and a call server on the packet-switched network engages in packet-based signaling with the enterprise network to set up calls inside the enterprise network between the enterprise telephone stations, the improvement comprising:
a wireless wide area network (WWAN) modem for providing a WWAN backup link between the enterprise network and the packet-switched network;
routing logic, operable upon failure of the landline connection, to route the packet-based signaling via the WWAN backup link between the enterprise network and the packet-switched network, so as to allow continued setup of calls having bearer paths within the enterprise network between the enterprise telephone stations; and
call-server-logic at the call server, operable upon failure of the landline connection, allowing setup of calls having bearer paths within the enterprise network between the enterprise telephone stations, while preventing setup of all but certain designated calls having bearer paths extending from the enterprise network and through the WWAN connection.

12. The improvement of claim 11, wherein the enterprise network comprises a router having the routing logic, wherein the routing logic defines a primary static route via the landline connection and a secondary static route via the WWAN modem.

13. The improvement of claim 12, wherein the routing logic defines the primary static route as a lower cost route than the secondary static route, so that (i) the router normally uses the primary static route and (ii) the router uses the secondary static route when the primary static route becomes unavailable.

14. The improvement of claim 11, wherein the WWAN modem establishes the WWAN backup link via a cellular radiocommunication system.

15. The improvement of claim 11, wherein the WWAN modem is integrated within the router.

16. The improvement of claim 11, wherein the call server comprises an IP Centrex server.

17. The improvement of claim 11, wherein the packet-based signaling comprises Session Initiation Protocol (SIP) signaling.

18. The improvement of claim 11, wherein the call-server-logic allows emergency service calls via the WWAN backup link but precludes other outside calls via the WWAN backup link.

* * * * *